United States Patent [19]

Suzuki

[11] 4,415,935
[45] Nov. 15, 1983

[54] TANGENTIAL SERVO CONTROL SIGNAL GENERATING DEVICE FOR RECORDED DATA REPRODUCING DEVICE

[75] Inventor: Koichi Suzuki, Saitama, Japan

[73] Assignee: Universal Pioneer Corporation, Tokyo, Japan

[21] Appl. No.: 168,231

[22] Filed: Jul. 10, 1980

[30] Foreign Application Priority Data

Jul. 12, 1979 [JP] Japan ............................ 54-88848
Dec. 12, 1979 [JP] Japan ........................... 54-161195

[51] Int. Cl.³ ............................................. H04N 9/44
[52] U.S. Cl. ................................... 358/320; 358/321; 358/324; 358/326
[58] Field of Search ................ 358/4, 8, 19, 324–326; 360/36, 75

[56] References Cited

U.S. PATENT DOCUMENTS 3,967,311 6/1976 Fuhrer ..................................... 358/8
3,990,103 11/1976 Stalley et al. .................... 358/326 X
4,127,866 11/1978 Yamashita ...................... 358/326 X
4,178,607 12/1979 Mikado ........................... 358/326 X
4,259,698 3/1981 Takada ............................ 360/75 X Primary Examiner—Aristotelis M. Psitos
Attorney, Agent, or Firm—Sughrue, Mion, Zinn, Macpeak and Seas

[57] ABSTRACT

A tangential servo control signal generating device for a device for reproducing recorded data from a video disc for controlling the movement of a pick-up in the tangential direction of the video disc. A color burst signal is inverted in phase for every other period of a regenerative horizontal synchronizing signal. This signal is gated by a detection signal the timing of which is determined by the occurrence of the predetermined reference point on the waveform of the color burst signal. An error signal is generated in accordance with the phase or timing difference between the detection signal and the occurrence of the predetermined reference signal which is used to form a tangential servo control signal.

9 Claims, 25 Drawing Figures

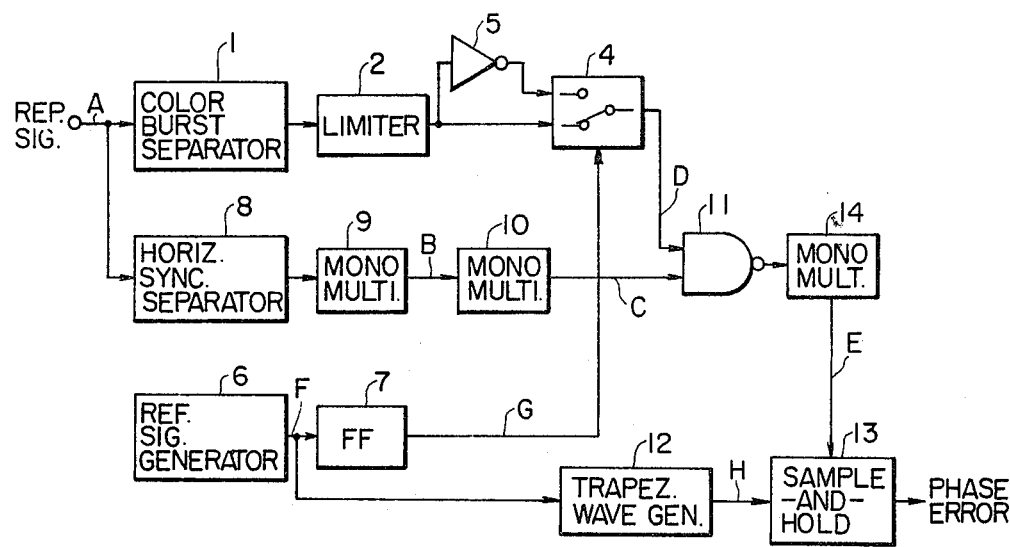
FIG. 1
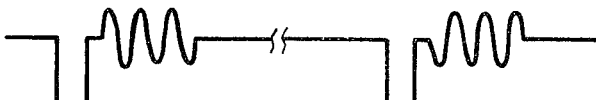
FIG. 2(A)
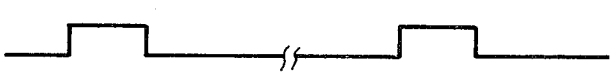
FIG. 2(B)
FIG. 2(C)
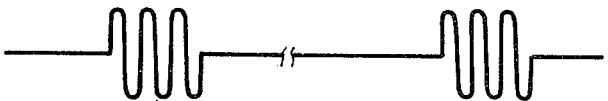
FIG. 2(D)
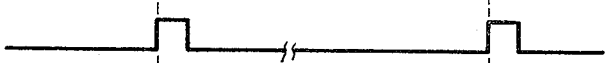
FIG. 2(E)
FIG. 2(F)
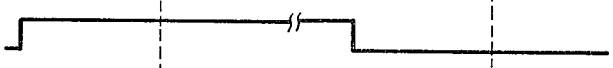
FIG. 2(G)
FIG. 2(H)

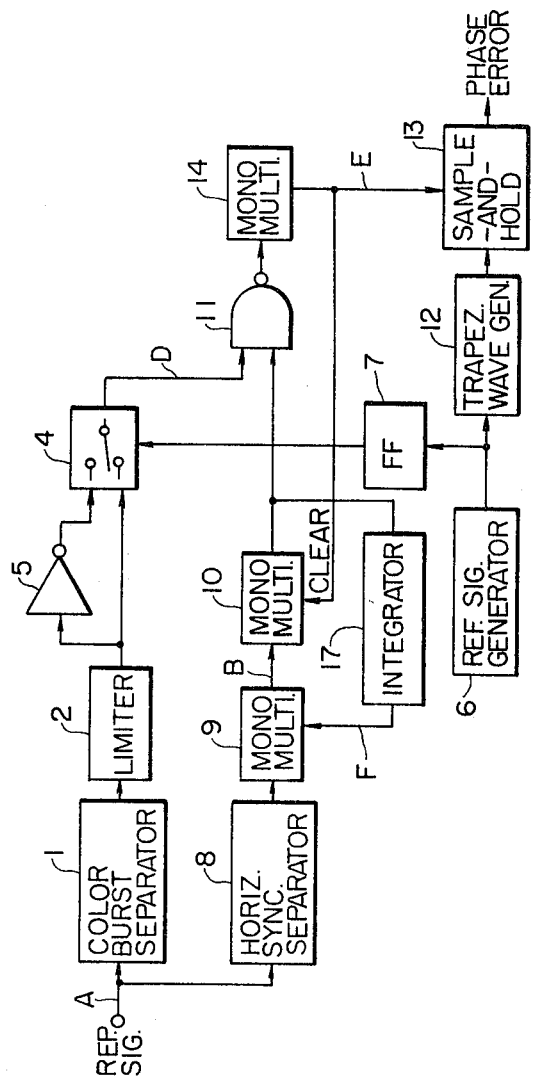

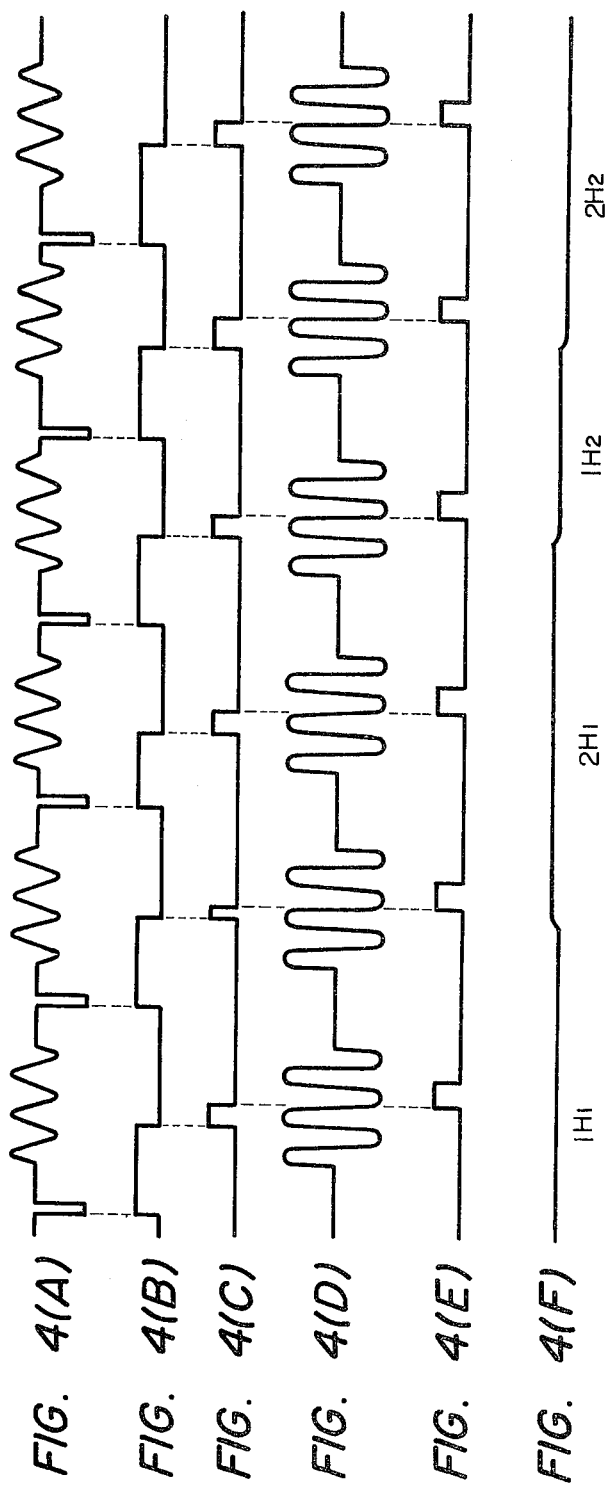

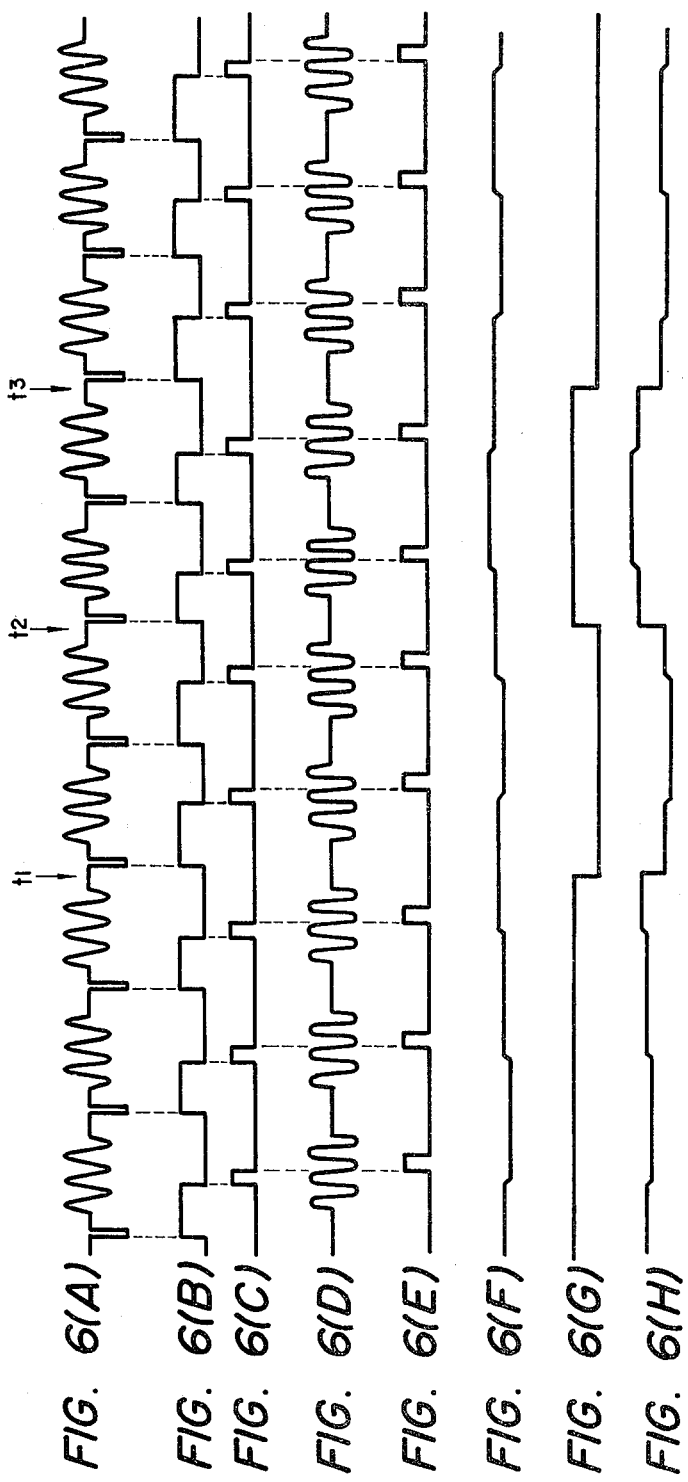

TANGENTIAL SERVO CONTROL SIGNAL GENERATING DEVICE FOR RECORDED DATA REPRODUCING DEVICE

BACKGROUND OF THE INVENTION

The present invention relates to tangential servo control signal generating devices for recorded data reproducing devices. More particularly, the invention relates to a so-called "tangential servo control signal generating device" for controlling the movement of a pick-up in the tangential direction of a video disc in a data reading device.

Video data or the like is stored or recorded on the recording surface of a video disc by arranging minute pits in the form of spiral tracks with, for example, the length or depth of the pits varied according to the video signals recorded. Data recorded on a video disc is reproduced optically as follows. A pickup light beam is focused on the video track while the disc is rotated at a predetermined fixed speed so that the variations in intensity of light reflected by or passing through the disc are converted into electrical video signals.

In order to reproduce pictures satisfactorily with such a recorded data reproducing device, the provision of various servo devices is essential. One of the servo devices is a so-called "tangential servo control device" which is provided to correct the time axis of a regenerative signal. The tangential servo control device operates, for instance, as follows. With one prior art technique, the regenerative color burst signal in a regenerative signal and a sub-carrier signal (3.58 MHz) provided separately as a reference signal are subjected to phase comparison. A phase difference signal obtained as a result of the phase comparison is employed as a tangential servo control signal to control the rotation of a tangential mirror to thereby control the position of the pickup light spot in the tangential direction of the track.

The color burst signal is a signal which, as well known in the art, is obtained by generating 8 to 11 cycles of a signal having the same frequency (3.58 MHz) and phase as the sub-carrier on the "back porch" of the horizontal synchronizing signal. The color burst signal is generated once for every occurrence of the horizontal synchronizing signal, that is, it is an intermittent signal. If a relative position of the light spot in the tangential direction is shifted for some reason while the phase of the burst signal is shifted by an integer multiple 360°, the shift cannot be detected and the phase error is locked in and, accordingly, the phase errors disadvantageously are accumulated.

In a second prior art technique, the "zero crossing point" of the regenerative color burst signal, which is delayed by a predetermined time from the regenerative horizontal synchronizing signal, is detected to provide a timing detection signal, the timing detection signal and a reference signal synchronous with a separately provided horizontal synchronizing signal are subjected to phase comparison, and the resultant phase difference signal is employed as a tangential servo control signal.

With this technique, if for some reason the phase of the regenerative color burst signal is shifted by 180°, it is impossible to detect the phase shift. When performing a "jump" operation, for example, for double-speed reproduction, the regenerative signal is different in frame and its regenerative color burst signal is shifted by 180° in phase, that is, inverted. As the 180° phase shift cannot be detected, the 180° phase shift is locked in. Accordingly, in order to make the phase of the regenerative color burst signal continuous, disadvantageously it is necessary to provide an additional correction circuit.

In general, in the NTSC television system, the sub-carrier frequency (3.58 MHz) is an odd integer multiple of half of the horizontal synchronizing signal frequency. The color burst signal is superposed on the "back porch" of the horizontal synchronizing signal for several cycles with its phase difference with respect to the horizontal synchronizing signal being shifted by 180° for every period of the horizontal synchronizing signal. In practice, the color burst signal is provided by a circuit in which the sub-carrier, which is a continuous sine wave, is superposed on a video compound signal by gating the sub-carrier with a burst flag signal for a predetermined period, usually 8 to 11 cycles. Therefore, the phase of the color burst signal is continuous.

In view of the foregoing, an object of the present invention is to eliminate the above-described difficulties accompanying a conventional system. More specifically, an object of the invention is to provide a tangential servo control signal generating device of simple construction in which, even if the phase of a color burst signal is shifted, the phase is corrected satisfactorily so that a color burst signal having a correct, continuous phase is provided at all times.

It is a further object of the invention to provide a tangential servo signal generating device for a recorded data reproducing device in which accumulation in one direction of a tangential error caused by large variations in the phase of the burst signal at the time of jump is prevented thereby to minimize the burst detection error.

SUMMARY OF THE INVENTION

In view of the foregoing, the present invention provides a tangential servo control signal generating device in which the regenerative color burst signal is subjected to phase inversion for every other period of the horizontal synchronizing signal, the timing of the occurrence of a predetermined reference point on the waveform of the color burst signal for every period of the regenerative horizontal synchronizing signal is detected, and the phase difference between the occurrence of the reference point and the reference signal is detected to provide a tangential error signal.

Yet further in accordance with the invention is tangential servo control signal generating device is provided in which a regenerative color burst signal is produced which is inverted in phase every other period of the horizontal synchronizing signal, the occurrence of a predetermined reference point on the color burst signal is detected, and a tangential servo control signal is provided according to the phase difference between the occurrence of the reference point and a reference signal. A specific advantageous feature of the device of the invention is that, in response to an instruction signal which causes the reading device to jump recording tracks, the predetermined reference point on the output color burst waveform is changed. At a first jump, the servo operation is effected so that it is longer or shorter than the regular time while at a second jump the servo operation is effected in the direction of the regular time. These operations are successively repeated, so that the detection position of the reference point in the color burst signal does not shift in one direction only so that the predetermined reference point can be accurately detected at all times.

BRIEF DESCRIPTION OF THE DRAWINGS

FIG. 1 is a block diagram of a first preferred embodiment of a tangential servo control signal generating device of the invention;

FIG. 2 is a series of waveform diagrams for a description of the operation of the embodiment shown in FIG. 1;

FIG. 3 is a block diagram showing a second embodiment of a tangential servo signal generating device of the invention;

FIG. 4 is a diagram showing signal waveforms at various points in the circuit of FIG. 3;

FIG. 6 is a diagram showing signal waveforms at various points in the circuit of the device of FIG. 5.

DESCRIPTION OF THE PREFERRED EMBODIMENTS

Figure 5:
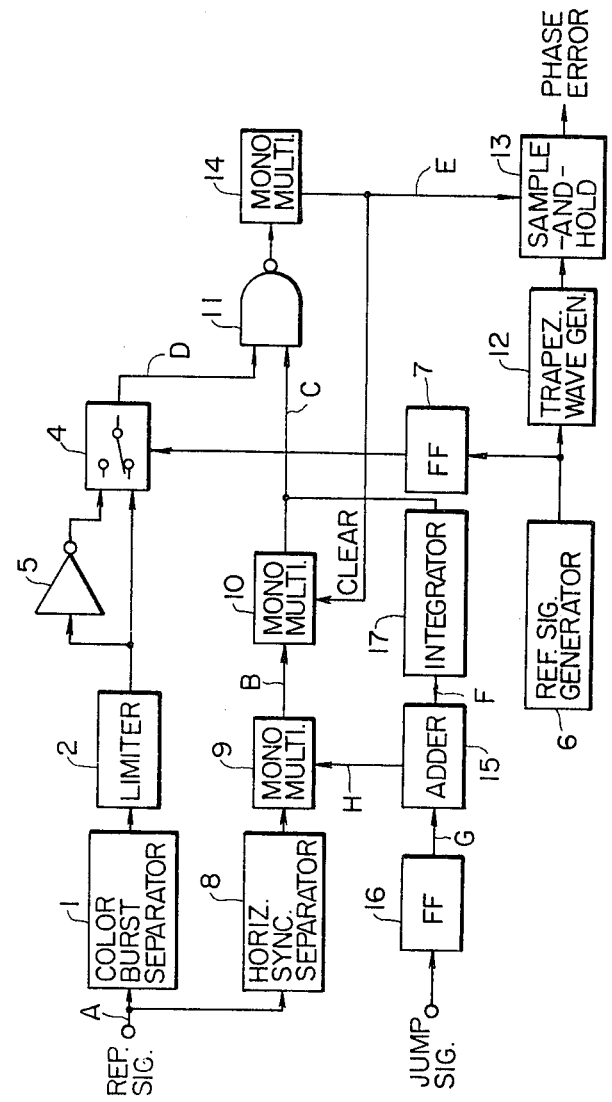
FIG. 5 is a block diagram showing a third embodiment of a tangential servo signal generating device according to the invention.

The invention will now be described with reference to the accompanying drawings.

FIG. 1 is a block diagram showing a first preferred embodiment of the invention. A burst signal separating circuit 1 formed of a 3.58 MHz bandpass filter for separating a color burst component from a regenerative video compound signal A is provided. A regenerative color burst signal outputted by the burst signal separating circuit 1 is applied to a limiter circuit 2 where amplitude variations are removed from the signal as a result of which a pulsed signal waveform is obtained. The limiter output is applied to a change-over switch circuit 4 both directly and through a phase inverter circuit 5.

A reference signal generated by the circuit 6 is a square wave signal F having, for instance, a 50% duty cycle and which has an oscillation frequency equal to the frequency of the horizontal synchronizing signal. The frequency of the signal F is halved by a toggle flip-flop circuit 7 as a result of which a switching signal G is provided for controlling the switch circuit 4.

A regenerative horizontal synchronizing signal separating circuit 8 is provided to separate the horizontal synchronizing signal from the regenerative signal A. A first monostable multivibrator 9 connected to the circuit 8 is triggered in synchronization with the generation of the regenerative horizontal synchronizing signal output. A second monostable multivibrator 10 connected to the output of the first monostable multivibrator 9 is triggered by a pulse output signal B generated by the monostable multivibrator 9. A pulse output signal C generated by the monostable multivibrator 10 is applied to one input of a NAND gate 11 to the other input of which is applied to the output signal D from the change-over switch circuit 4 which is the regenerative color burst signal directly or inverted.

A trapezoidal wave generating circuit 12 generates a trapezoidal wave signal H in synchronism with the reference signal F. The signal H is applied to a sample-and-hold circuit 13. The output of the NAND gate 11 triggers a monostable multivibrator 14 which generates a pulse output signal E. In response to the generation of the pulse output signal E, the sample-and-hold circuit 13 samples the trapezoidal waveform signal H and holds the sampled value until the generation of the next pulse of the sampling signal E. The output of the sample-and-hold circuit 13 forms the tangential error signal.

The operation of the circuit shown in FIG. 1 will be described with reference to FIG. 2 which shows waveforms at various points within the circuit. In FIGS. 1 and 2, like signal waveforms are designated by like reference characters.

The switch circuit 4 is operated by the output signal G from the flip-flop circuit 7. The period of the signal G is twice that of the horizontal synchronizing signal. With the switch circuit 4 controlled so that the output of the limiter circuit 2 is coupled directly to the NAND gate 11 during the first half of each period of the signal G and the output of the limiter circuit 2 is coupled through the inverter circuit 5 during the second half, a regenerative color burst signal whose phase is inverted every other horizontal period is provided as the output D of the switch circuit 4. Accordingly, the regenerative color burst signal has a constant phase with respect to the regenerative horizontal synchronizing signal as may be seen from the waveform D in FIG. 2 and each burst signal begins with a rising edge.

The output signal D from the switch circuit 4 and the gate signal C from the monostable multivibrator 10 are generated a predetermined period of time after the occurrence of pulses of the regenerative horizontal synhcronizing signal. Therefore, changes in the state of the output of the NAND gate 11 occur in synchronization with the first falling edge of the color burst output signal D during the period of generation of the gate signal C. The output signal E from the monostable multivibrator 14 falls with a transition in the output of the NAND gate 11. The transition time is here considered as the "zero crossing point" or zero phase reference for the regenerative color burst signal which appears firstly during the period of the gate signal C.

Accordingly, with the output signal E from the monostable multivibrator 14 employed as a sampling signal for the trapezoidal wave H, the level of the trapezoidal wave at the sampling time is indicative of the phase difference between the reference signal and the regenerative color burst signal.

For instance, if the phase of the regenerative color burst signal is shifted by 180°, the burst signal corresponding to the shifted part becomes a signal obtained by inverting the signal of waveform D in FIG. 2 and, in response thereto, the timing signal of waveform E in FIG. 2 is generated with a corresponding shift. As the error signal is produced in response to the timing signal, the tangential mirror is moved in the tangential direction of the track by a distance such that the color burst phase is accurately corrected and the correct color burst phase is maintained.

With the described construction, the reference signal subjected to phase comparison is not the sub-carrier signal. That is, a signal synchronous with the horizontal synchronizing signal is employed as the reference signal and the phase difference with respect to the occurrence of a predetermined reference point on the waveform of the regenerative color burst signal is detected for every period of the reference signal. Therefore, there is no accumulation of phase errors.

In the above-described embodiment, the falling edge of the second peak of the regenerative color burst signal is used for the determination of the reference point on the waveform. However, the invention is not limited thereto or thereby. That is, the rising edge, a maximum peak or a minimum peak may be selected as the predetermined reference point. The circuit can be modified variously. In the above-described embodiment, a trapezoidal signal is utilized although all that is necessary is to provide a signal waveform having a sloping portion.

A second preferred embodiment of a tangential servo control signal generating device is shown in FIG. 3. In FIGS. 1 and 3, like parts are designated by like reference numerals. Therefore, only components which are different from those in FIG. 1 will be described. In the device of FIG. 3, the output signal C of the monostable multivibrator 10 is cleared with the rising edge of the output signal E from the monostable multivibrator 14 and is coupled to the input of an integrator circuit 17. The integrator 17 produces in response thereto a signal having an amplitude corresponding to the width of the pulse C. The output signal from the integrator circuit 17 is used to control the width of the output pulse signal B from the monostable multivibrator 9.

FIG. 4 is a diagram showing waveforms at various points in the circuitry shown in FIG. 3. In FIGS. 3 and 4, like waveforms are designated by like reference characters. The normal width of the gating pulse output signal C from the monostable multivibrator 10 is set larger than a wavelength of the color burst signal. When the burst output signal D is gated at the predetermined reference point, the gating pulse signal C is cleared and the pulse width output signal B from the monostable multivibrator 9 is set in accordance with the level of the output of the integrator output signal F corresponding to the width of the gating pulse signal C. Therefore, the pulse width of the signal B is so set that, during the normal period, it falls a half wavelength before (the second rising edge in this case) the reference point position (the second falling edge) on the burst output signal D.

Thus, as shown in FIG. 4, during the first horizontal scan period (first H), if no phase shift is present, the level of the integrator output signal F remains unchanged and therefore the width of the pulses of the output signal B from the multivibrator 9 is also maintained constant. During the second H, if a phase lead occurs as shown in the figure, the width of the pulses of the gating signal C is reduced by an amount corresponding to the amount of phase lead as a result of which the level of the integrator output F increases. Therefore, during the third H the width of the pulses of the signal B from the monostable multivibrator 9 is decreased by an amount corresponding to the amount of phase lead when compared with that in a normal period. As may be clearly seen, the width of the pulses of the signal C is so controlled that it is equal to one half the wavelength of the burst signal D at that time. If the phase becomes normal as indicated in the next period fourth H, the integrator output signal F also returns to its normal value. If a phase lag occurs during the fifth H, the width of the pulse C is increased and the level of the integrator output signal F is decreased. Therefore, the width of the pulses of the signal B is increased in the sixth H and the rising edge of the pulse C is delayed. As a result, the pulse width of the signal C becomes equal to a half wavelength of the burst signal D at that time.

No matter whether the phase leads or lags, that is, whether the speed in the tangential direction of the disc increases or decreases, the width of the pulses is so controlled that it is equal to a half wavelength of the burst signal D. Therefore, the predetermined reference point, the second rising edge of the burst signal D, is accurately detected at all times.

A third preferred embodiment of the invention is shown in FIG. 5 in which those components which have been described with reference to FIGS. 1 and 2 are therefore similarly numbered. Only the components which are different from those in FIG. 3 will be described. The integration output signal F from the integrator circuit 17 is applied to one input of an adder 15 to the other input of which the output G of a toggle flip-flop circuit 16 is applied. The addition output signal H from the adder 15 is employed as the pulse width control signal for the monostable multivibrator 9. The jump instruction signal which controls the reading device or pickup is applied to the clock input of the flip-flop circuit 16. The other construction of the circuit of FIG. 6 is similar to that of the circuit in FIG. 3 and will therefore not be described.

FIG. 6 shows signal waveforms at various points in the circuit in FIG. 5. In FIGS. 5 and 6, like waveforms are designated by like reference characters.

Whenever the jump instruction signal is present, the flip-flop circuit 16 is toggled and the output signal G of the flip-flop circuit 16 is set alternately to high and low levels as shown in waveform G of FIG. 6. The level difference is set to a value such that the width of the pulse B is increased or decreased by a length corresponding to a half wavelength, that is, half the period of the burst signal D. Accordingly, the width of the pulses of the output signal B from the monostable multivibrator 9 is varied in proportion to the output level G by as much as the length corresponding to the half wavelength of the burst signal D. It is assumed that the flip-flop circuit 16 outputs the low level signal G immediately after the first jump instruction as shown in FIG. 6. In this case, the pulse width of the signal B is increased by a half wavelength of the burst signal D thereby cancelling the 180° phase shift of the burst signal D. Therefore, the pulse width of the output signal C from the monostable multivibrator 10 becomes equal to a half wavelength of the burst signal D. In this operation, the reference point is moved from 3/2 wavelengths from the start of the burst signal to 4/2 wavelengths from the start.

At the second jump, the flip-flop circuit 16 again outputs the high level signal G and therefore the pulse width of the signal B is reduced by a half wavelength of the burst signal D. That is, it has a normal length while the pulse width of the signal C is maintained unchanged. That is, it is equal to a half wavelength of the burst signal D. In this case, the reference point is returned to the 3/2 wavelength position on the burst signal D. The operation at the third jump is similar to that at the first jump.

As is clear from the above description, in accordance with this embodiment of the invention, the pulse width of the signal B is increased and decreased alternately every jump so that the reference point position with respect to the burst signal D is changed every jump. Therefore, a difficulty that the detection position may move every jump in one direction only is eliminated. Furthermore, since the amount of variation of the pulse width of the signal B at the time of jump is made equal to a half wavelength of the burst signal D, the width of the pulse C is maintained equal to that for normal operation. That is, it is so controlled as to be made equal to a half wavelength of the burst signal D. Accordingly, no matter whether the phase of the burst signal D leads or lags at the time of jump, the reference point position is maintained regular.

What is claimed is:

1. A tangential servo control signal generating device for generating a tangential servo control signal for correcting time base variations in a regenerative color signal reproduced from recorded data in a recorded data reproducing device comprising:
   means for providing a regenerative horizontal synchronizing signal from said regenerative color signal;
   means for providing a regenerative color burst signal from said color signal for each period of said regenerative horizontal synchronizing signal;
   color burst signal generating means for providing a color burst output signal by phase inverting said regenerative color burst signal every other period of said regenerative horizontal synchronizing signal and passing said regenerative color burst signal directly for periods of the regenerative horizontal synchronizing signal other than said every other period of said regenerative horizontal synchronizing signal;
   means operating in response to said color burst output signal for providing a detection signal a predetermined time after the start of each burst of said color burst output signal;
   means for providing a reference signal synchronized with said regenerative horizontal synchronizing signal; and
   means for comparing relative phases of said detection signal and said reference signal for producing an error signal indicative of a phase difference between said detection signal and said reference signal, said error signal forming said tangential servo control signal.

2. The tangential servo control signal generating device of claim 1 wherein said reference signal has a period coincident with the period of said horizontal synchronizing signal.

3. The tangential servo control signal generating device of claim 2 wherein said means for providing said error signal generates a slope waveform signal in synchronization with said reference signal and wherein said means for providing said error signal comprises means for sampling an amplitude value of said slope waveform signal in response to said detection signal.

4. The tangential servo control signal generating device of claim 1 further comprising means for adjusting the pulse width of said detection signal in accordance with a phase difference of a previous pulse of said detection signal with respect to said predetermined reference point.

5. The tangential servo control signal generating device of claim 4 further comprising means for changing the position of said predetermined reference point periodically in response to an instruction signal for causing reading means to jump recording tracks.

6. A tangential servo control signal for generating a tangential servo error control signal for correcting time base variations in a regenerative generating device for a recorded data reproducing device comprising:
   a color burst signal separator;
   an inverter circuit having an input coupled to an output of said color burst signal separator;
   a switching circuit having first and second input contacts coupled, respectively, to an output of said inverter means and said output of said color burst signal separator;
   a first monostable multivibrator having a trigger input coupled to an output of a horizontal synchronizing signal separator;
   a second monostable multivibrator having a trigger input coupled to an output of said first monostable multivibrator;
   a gating circuit having inputs coupled to an output contact of said switching circuit and an output of said second monostable multivibrator;
   a reference signal generator;
   a toggling flip-flop having a clock signal input coupled to an output of said reference signal generator and an output coupled to a control input of said switching circuit;
   means for generating a slope waveform, said waveform generating means operating in synchronization with said output of said reference signal generator;
   a third monostable multivibrator having a trigger input coupled to an output of said gate circuit; and
   a sample-and-hold circuit having a data signal input coupled to an output of said waveform generating means and having a sampling signal input coupled to an output of said third monostable multivibrator, an error signal forming said tangential servo control signal being formed at the output of said sample-and-hold circuit.

7. The tangential servo control signal generating device of claim 6 further comprising an integrator circuit having an input coupled to said output of said second monostable multivibrator and having an output coupled to an input of said first monostable multivibrator for controlling the width of output pulses from said first monostable multivibrator and wherein said output of said third monostable multivibrator is coupled to a reset input of said second monostable multivibrator.

8. The tangential servo control signal generating device of claim 7 wherein the pulse width of said output signal from said second monostable multivibrator is made equal to half the period of said color burst output signal.

9. The tangential servo control signal generating device of claim 6 further comprising:
   an integrator circuit having an input coupled to said output of said second monostable multivibrator;
   a second toggle flip-flop having an input coupled to receive a signal for causing reading means to jump recording tracks;
   an adder circuit having a first input coupled to an output of said second toggle flip-flop and a second input coupled to an output of said integrator; and
   wherein said output of said third monostable multivibrator is coupled to a reset input of said second monostable multivibrator.

* * * * *